Nov. 30, 1948.    L. S. HAMER    2,455,121
FITTING FOR PIPE LINES
Filed Dec. 4, 1944
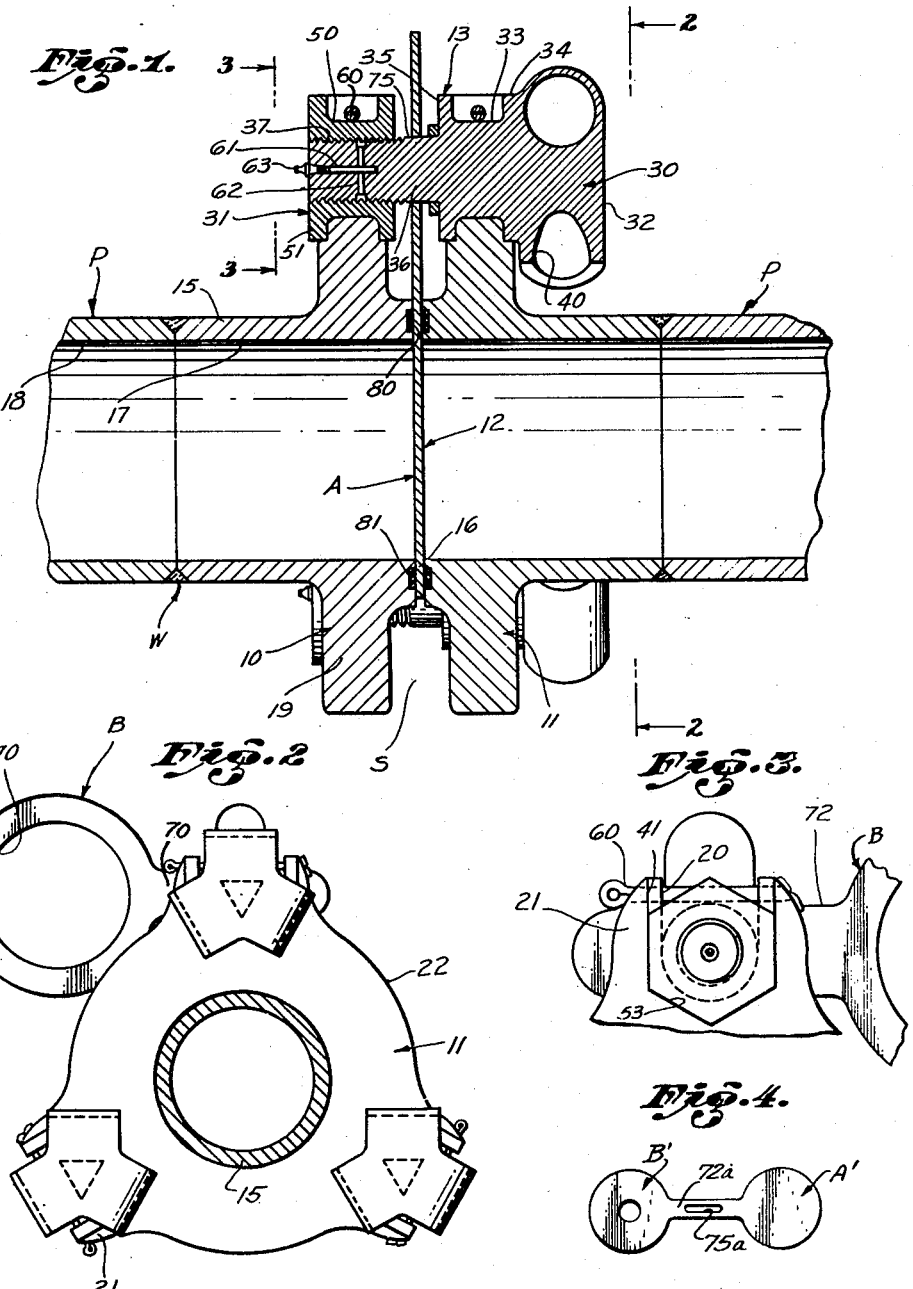
Inventor
LELAND S. HAMER
By
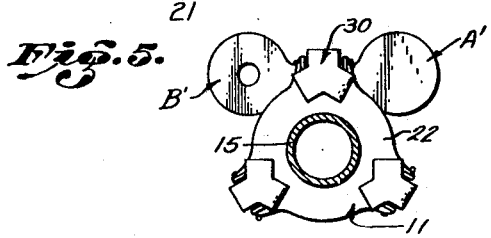
His Attorney

UNITED STATES PATENT OFFICE 2,455,121

FITTING FOR PIPE LINES

Leland S. Hamer, Long Beach, Calif., assignor of one-fourth to Paul A. Dewhirst, Los Angeles, Calif.

Application December 4, 1944, Serial No. 566,616

9 Claims. (Cl. 138—44)

This invention has to do with a fitting for pipe lines and the like, and more specifically relates to a structure suitable for use as a line blind or as an orifice fitting. It is a general object of the present invention to provide a simplified, effective and inexpensive device of the general character referred to.

There are numerous situations where it is desired to apply a plate such as a blinding plate or an orifice plate to a conduit. Such situations usually occur in pipe lines and the device used for handling the plate is commonly in the nature of a pipe line fitting. In describing the present invention I will refer to it as a pipe line fitting although it may be used in connection with elements or structures other than a pipe line. The structure of the present invention is, in fact, useful generally where it is desired to provide a blinding plate or an orifice plate to control fluid.

It is a general object of the present invention to provide a pipe line fitting for handling a plate such as an orifice plate or a blinding plate, which fitting involves few simple, inexpensive parts.

It is another object of the invention to provide a fitting of the general character referred to which is extremely simple and convenient to operate. The device of the present invention is such that the several parts can be readily assembled or dismantled and the fitting as a whole can be easily operated by means of a simple wrench or bar.

Another object of the present invention is to provide a fitting of the character referred to in which the parts that require machining are few in number and are such that the machining operations are simple and easy to perform.

It is another object of this invention to provide a pipe line fitting of the character referred to which is neat and compact. The device that I have provided does not project appreciably from the pipe line in which it is connected. In fact, it is little larger or more bulky than an ordinary flange connection such as is common in pipe lines.

Another object of the invention is to provide a fitting of the general character referred to in which the plate or plates carried by the device are attached to the fitting so that they will not, under ordinary circumstances, become separated therefrom.

Another object of the present invention is to provide a fitting of the general character referred to in which the plate or plates employed in the fitting can be attached to the fitting at various points around it, making the fitting convenient for use in various restricted locations.

The various objects and features of my invention will be fully understood from the following detailed description of typical preferred forms and applications of the invention, throughout which description reference is made to the accompanying drawings, in which:

Fig. 1 is a longitudinal detailed sectional view of the fitting provided by the present invention showing it connected in a pipe line. Fig. 2 is an end view of the structure being a view taken as indicated by line 2—2 on Fig. 1. Fig. 3 is a view taken as indicated by line 3—3 on Fig. 1. Fig. 4 is a face view of a form of plate that can be used showing the plate separate from the other parts, and Fig. 5 is an end view of the fitting showing the plate illustrated in Fig. 4 in an intermediate position where both ends are out from between the body sections.

The fitting embodying the present invention is useful, generally, for handling or controlling fluids and since its most common use is in a pipe line which handles fluids I will describe it as a pipe line fitting and I have, in the drawings, shown it connected in a pipe line. In Fig. 1 of the drawings I have shown the fitting of the present invention connected between two aligned pipes P. In the drawings I have shown the fitting joined to the pipe line by means of welding W. It is to be understood, of course, that any suitable connection or means of joinder may be employed for connecting the fitting to the pipes or other elements to which the fitting is to be joined.

The fitting embodying the present invention involves, generally, two main or body sections 10 and 11, one or more plates 12 to be arranged between the body sections, and tie means 13 for joining or coupling the body sections and operable to tighten the body sections into the plate. The structure involves various additional elements and structural features, all of which will appear from the following description.

The sections 10 and 11 which form the principal parts of the fitting may be, in fact, preferably are, alike in form and construction and are adapted to be connected to the pipes P so that they are in opposed relation one to the other.

In accordance with my invention each of the principal sections of the fitting involves a central tubular part 15 the outer end of which is adapted to be joined to a pipe P as by welding W, or the like, while its inner end is somewhat enlarged and presents a finished flat face 16 to oppose or bear against one side of the plate 12. The opening 17 provided through the tubular section 15 is preferably shaped and proportioned to form a continuation of the opening 18 of the pipe P, however, it may be a different size or shape if so desired.

The main section of the fitting in addition to having the tubular part 15 has a radially projecting annular flange 19 at or close to its inner end, which flange serves to strengthen and reinforce the fitting section generally and serves as a means to carry or support the tie means 13. In accordance with the preferred form of the invention the flange 19 is spaced or removed somewhat inward from the inner end face 16 of the section so that when the main sections of the fitting are in operating position at opposite sides of a plate 12 there is a space S between the flanges of the two sections sufficient to accommodate two or more plates 12.

In accordance with my invention the flange 19 is fashioned to receive or accommodate the means 13. The means 13 as I will describe, involves a plurality of like tie devices adapted to be spaced around the fitting and, therefore, flange 19 is provided at suitable intervals or points with openings to accommodate the means 13. In the preferred form of the invention I provide three units of the means 13 and therefore provide three notch-shaped openings 20 in the outer or peripheral portion of the flange 19. The notches are radially disposed outwardly opening notches spaced equally around the flange. In the preferred construction the flange has projections or ears 21 at the notched portions projecting radially beyond the normal periphery 22 of the flange. The ears, in effect, extend the notches to give them the desired depth.

Each unit of the tie means 13 preferably involves, generally, a bolt 30 and a nut 31. These parts are applied to the flanges of the main sections 10 and 11 so that the bolt is carried by one section while the nut is carried by the other section. The arrangement is reversible, that is, the parts can be rearranged so the nut is carried by either section. In the case illustrated the bolt is carried by the section 11 while the nut is carried by the section 10. In accordance with my invention the nut and bolt of each tie means is designed to be carried or accommodated by notches in the flanges of the main sections.

The bolt 30 of each unit of the means 13 includes, generally, a head 32, a shank 33 projecting from the head, flanges 34 and 35 at the ends of the shank and an extension 36 projecting from the outer end of the shank and having its outer end portion threaded at 37 to be received in nut 31.

The head 32 of the bolt may, in practice, be shaped or designed to be engaged by a wrench or suitable operating tool. In the case illustrated I have shown a head designed with several openings 40 spaced around the axis of the bolt and designed to accommodate an operating bar or the like.

The shank 33 of the bolt is preferably a turned part proportioned to slidably fit into a notch 20 in a flange 19. The flanges 34 and 35 at either end of the shank 33 are adapted to be accommodated in recesses 41 provided at opposite sides of the flange adjoining the notch 20. The flanges 34 and 35 are turned concentric with the shank 33 and fit the recesses 41 in the two sides of the ears 21 so that the bolt 30 is held in the flange against axial movement but is free to rotate, the diameters of the flanges 34 and 35 being such as to fit between the sides of the recesses 41 with enough clearance to allow for free rotation.

The extension 36 of the bolt is a turned part concentric with the shank 33 and is adapted to extend across the opening S between the two flanges 19 and has its outer end portion threaded to be accommodated in the nut 31.

The nut 31 has a central or body portion 50 corresponding in size and shape to the shank 33 of the bolt and adapted to be received in a notch in a flange 19 or in an ear 21 of a flange 19. In addition to the body part 50 the nut has two end flanges 51 which project radially beyond the periphery of the body part which flanges are polygonal or have flat sides designed to bear against the walls of the recesses 41 so that the nut is held against turning in the notch. In the preferred form of the invention the flanges 51 are hexagonal in shape so that opposite sides will slidably fit opposed walls of the recesses 41 while two adjoining sides fit against or bear in flat sides 53 at the bottom of the recesses 41. It will be observed from an examination of Fig. 3 how the bottoms of the recesses have their flat sides 53 formed at angles to fit the peripheral contour of the nut flanges 51.

In accordance with my invention I prefer to provide means for retaining the bolts and nuts 30 and 31 in the notches of the flanges 19 so that these parts are not free to be accidentally dislodged. To secure the parts of the means 13 in the notches I prefer to provide keys 60 to extend between the outer end portions of the ears 21 or across the outer portions of the notches to close the notches. In practice I find it advantageous to use cotter keys as I have shown throughout the drawings. It will be readily understood that cotter keys arranged as I have shown are effective in retaining the nuts and bolts in the notches provided in the flanges 19 and yet they can be readily manipulated so that they can be withdrawn allowing the nuts and bolts to be removed whenever desired.

In practice I prefer to provide means for lubricating the threaded connection provided between the nut 31 and the bolt 30. To effect such lubrication I may provide a longitudinal port 61 in the bolt from the outer end of the extension 36, radial distributing ports 62 adjoining the inner portion of port 61, and a lubricant fitting 63 at the outer end of the port 61. With this construction a suitable lubricant can be readily supplied to the ports 61 and 62 so that it enters the threads of the bolt and nut.

In carrying out my invention I may employ one or more plates 12 as circumstances require. In Figs. 1 to 3 I have shown the device fitted with two plates, a plate A which is a blinding plate, and a plate B which has an opening 70 through it to allow full opening through the fitting. In practice I prefer to arrange one plate at a time between the sections 10 and 11 so that it is clamped between the opposing end faces 16 of the two sections of the fitting. In the drawings I have shown the blinding plate 12 in operating position between the two main sections of the fitting and I have shown the apertured plate B out of operating position. In accordance with my invention I provide each plate with a mounting arm 72 which arm has an opening 75 proportioned to pass the extension 36 of a bolt 30. The arms are proportioned and the openings 75 are so located in the arms that when the plates are carried on a bolt, as shown in the drawings, the plates are free to be swung into operating position between the faces 16. In the case of the apertured plate B the parts are proportioned so that when this plate is swung into operating position the aperture 70 therein is concentric with or registers with the openings 17 through the main sections of the fitting.

In Figs. 1 to 3 I have shown two plates carried on one bolt 30, that is, I have shown the arm of plate A as well as the arm of plate B carried by the extension 36 of one bolt. It will be apparent that this may be any one of the bolts provided around the fitting, so that the plates can be carried at any position around the fitting and likewise it will be apparent that the plates do not have to be both carried by one bolt but can be carried by separate bolts, and that through my present invention a large number of plates of varying characters can be readily incorporated in one fitting, so that any one can be readily moved into operating position between the main sections 10 and 11 of the fitting. In accordance with the preferred form of my invention I provide means for sealing between the main sections 10 and 11 and a plate arranged between the sections. The sealing means may, in practice, vary widely with operating conditions that are to be met. In the drawings I have shown a simple arrangement wherein channels 80 are provided in the end faces 16 of the main sections and packing rings 81 are arranged in the channels so that packing normally projects from the ends of the main sections in a manner to engage and be pressed tightly against a plate 12 when the sections are made tight onto the plate.

In using the device of the present invention it is secured in a pipe line or to other parts in a manner such as is shown in the drawings. The plate or plates to be used in the fitting are assembled therewith on one or more of the bolts and the bolts and nuts of the means 13 are arranged in place and made secure by the keys 60. By operating the bolts 30 the main sections 10 and 11 can be moved apart to readily receive a plate 12 which may be any one of the several plates selected for use. When a plate is in place between the main sections the bolts 30 can be operated so that the main sections are drawn together in a manner to tightly clamp the plate 12 between them. By mere manipulation of the several bolts the main sections of the fitting can be tightened or released as desired, making it possible to manipulate the plates 12 in any desired manner. In practice the structure is such that the individual units of the means 13 can be detached from the other parts whenever desired, making it possible to connect the plate or plates 12 in the fitting at any desired point around the fitting, as circumstances may require.

In the form shown in Figs. 4 and 5 two plates A' and B' are joined by a single arm 72ª. Plate A' is a blinding plate and plate B' is shown as an orifice plate. The plates are at opposite ends of the single arm and the opening 75ª in arm 72ª is in the form of a slot allowing lengthwise movement of the arm relative to its supporting bolt so the unit formed by the two plates can be readily turned end for end. Either one or the other of the plates can be arranged in position between the body sections and when one is in working position the other projects from the body sections so the operator knows which plate is working. In Fig. 5 the unit formed by the plates is shown in a position through which it passes in the course of moving one plate in and the other out.

Having described only typical preferred forms and applications of my invention, I do not wish to be limited or restricted to the specific details herein set forth, but wish to reserve to myself any variations or modifications that may appear to those skilled in the art and fall within the scope of the following claims:

Having described my invention, I claim:

1. A fitting of the character described including, two opposed sections each having a tubular part and a notched flange on the tubular part, a plate to be arranged between the sections, and means tying the sections together including, a bolt carried directly in the notch in the flange of one section and a nut receiving the bolt and carried in the notch in the flange of the other section.

2. A fitting of the character described including, two opposed relatively movable sections each having a tubular part and a notched flange on the tubular part, a plate to be arranged between the sections, and means drawing the sections together to clamp the sections onto the plate including, a bolt carried directly in the notch in the flange of one section and a nut receiving the bolt and carried in the notch in the flange of the other section, the plate having an extension with an opening passing the bolt, the bolt when held by the unit acting to couple the plate to the body sections against separation therefrom.

3. A fitting of the character described including, two opposed sections each having a tubular part and a notched flange on the tubular part, a plate to be arranged between the sections, and means tying the sections together including, a bolt carried directly in the notch in the flange of one section, a nut receiving the bolt and carried directly in the notch in the flange of the other section, and means retaining the bolt and nut in the notches.

4. A fitting of the character described including, two opposed sections each having a tubular part and a notched flange on the tubular part, a plate to be arranged between the sections, and means tying the sections together including, a bolt carried directly in the notch in the flange of one section and a nut receiving the bolt and carried in the notch in the flange of the other section, the bolt having a part slidably fitting the notch and having flanges at the ends of said part holding the bolt against axial movement.

5. A fitting of the character described including, two opposed sections each having a tubular part and a notched flange on the tubular part, a plate to be arranged between the sections, and means tying the sections together including, a bolt carried directly in the notch in the flange of one section and a nut receiving the bolt and carried in the notch in the flange of the other section, the bolt having a part slidably fitting the notch and having flanges at the ends of said part holding the bolt against axial movement, the nut having a body slidably fitting the notch and having end flanges engaging the flange of said other section to hold the nut against axial movement and also against rotation.

6. A fitting of the character described including, two opposed sections each having a tubular part and a notched flange on the tubular part, a plate to be arranged between the sections, and means tying the sections together including, a bolt carried in the notch in the flange of one section and a nut receiving the bolt and carried in the notch in the flange of the other section, the bolt having a shank directly engaged in the notch, flanges at the ends of the shank, a head at one end of the shank and a threaded extension at the other end of the shank.

7. A fitting of the character described including, two opposed sections each having a tubular part and a notched flange on the tubular part, the notches in the flange being opposite each other, bolts rotatably carried in the notches in one flange, nuts held against rotation in the notches of the other flange and receiving the bolts, and a plurality of separate plates to be arranged between the sections, each plate having a projecting part with an opening passing a bolt for turning movement of the plate around the bolt.

8. A fitting of the character described including, two opposed sections each having a tubular part and a notched flange on the tubular part, the notches in the flanges being opposite each other, bolts rotatably carried in the notches in one flange, nuts held against rotation in the notches of the other flange and receiving the bolts, and a plurality of separate independently shiftable plates to be arranged between the sections, each plate having a projecting part at the exterior of the fitting with an opening passing one of the bolts so all of the plates are retained by one bolt, said plates being supported by said bolt for independent rotation about the bolt.

9. A fitting of the character described including, two opposed relatively movable sections each having a tubular part and a notched flange on the tubular part, a plate unit to be arranged between the sections, and clamp means tying the sections together and acting to clamp the sections to the plate and including, a bolt carried directly in the notch in the flange of one section and a nut receiving the bolt and carried directly in the notch in the flange of the other section, the plate unit including an arm with an opening to pass one of the bolts and a plate at each end of the arm, the plate unit being rotatably carried by the said bolt when the said bolt is engaged between the two sections so the arm can be manipulated around on the bolt to bring either plate between the sections.

LELAND S. HAMER.

REFERENCES CITED

The following references are of record in the file of this patent:

UNITED STATES PATENTS

| Number | Name | Date |
| --- | --- | --- |
| 213,142 | Strater et al. | Mar. 11, 1879 |
| 639,198 | McDonald | Dec. 12, 1899 |
| 1,609,894 | Trent | Dec. 7, 1926 |
| 1,631,264 | Haldeman | June 7, 1927 |
| 1,813,418 | O'Leary et al. | July 7, 1931 |
| 1,903,068 | Robinson | Mar. 28, 1933 |
| 2,039,912 | Leighton | May 5, 1936 |
| 2,214,959 | Hamer | Sept. 17, 1940 |
| 2,271,138 | Hamer | Jan. 27, 1942 |
| 2,309,304 | Creighton | Jan. 26, 1943 |